(12) United States Patent
Zhou (10) Patent No.: US 9,305,307 B2
(45) Date of Patent: Apr. 5, 2016

(54) SELECTING CONTENT ASSOCIATED WITH A COLLECTION OF ENTITIES

(71) Applicant: Google Inc., Mountain View, CA (US)

(72) Inventor: Yunkai Zhou, Los Altos, CA (US)

(73) Assignee: Google Inc., Mountain View, CA (US)

( * ) Notice: Subject to any disclaimer, the term of this patent is extended or adjusted under 35 U.S.C. 154(b) by 186 days.

(21) Appl. No.: 13/941,832

(22) Filed: Jul. 15, 2013

(65) Prior Publication Data

US 2015/0019335 A1    Jan. 15, 2015

(51) Int. Cl.
 *G06Q 30/02* (2012.01)

(52) U.S. Cl.
 CPC .................................. *G06Q 30/0256* (2013.01)

(58) Field of Classification Search
 None
 See application file for complete search history.

(56) References Cited

U.S. PATENT DOCUMENTS

| | | | |
|---|---|---|---|
| 6,839,701 | B1 | 1/2005 | Baer et al. |
| 7,039,704 | B2 | 5/2006 | Davis et al. |
| 7,089,239 | B1 | 8/2006 | Baer et al. |
| 7,546,623 | B2 | 6/2009 | Ramraz et al. |
| 7,689,510 | B2 | 3/2010 | Lamkin et al. |
| 7,779,097 | B2 | 8/2010 | Lamkin et al. |
| 7,831,685 | B2 | 11/2010 | Dai et al. |
| 7,849,104 | B2 | 12/2010 | Sun et al. |
| 7,987,194 | B1 | 7/2011 | Walker et al. |
| 8,122,016 | B1 | 2/2012 | Lamba et al. |
| 8,171,021 | B2 | 5/2012 | Guha et al. |
| 8,180,760 | B1 * | 5/2012 | Carver et al. ................. 707/708 |
| 8,364,525 | B2 | 1/2013 | Kothiwal et al. |
| 2006/0150214 | A1 | 7/2006 | Ramraz et al. |
| 2006/0159109 | A1 | 7/2006 | Lamkin et al. |
| 2006/0161635 | A1 | 7/2006 | Lamkin et al. |
| 2006/0206479 | A1 | 9/2006 | Mason |

(Continued)

FOREIGN PATENT DOCUMENTS

| | | |
|---|---|---|
| EP | 1589443 | 10/2005 |
| EP | 1843256 | 10/2007 |

(Continued)

OTHER PUBLICATIONS

International Search Report and Written Opinion in International Application No. PCT/US2014/045966, mailed Oct. 17, 2014, 12 pages.

(Continued)

*Primary Examiner* — Amanda Abrahamson
*Assistant Examiner* — Meredith A Long
(74) *Attorney, Agent, or Firm* — Fish & Richardson P.C.

(57) ABSTRACT

Methods, systems, and apparatus include computer programs encoded on a computer-readable storage medium, including a method for providing content. An indication is received from a content sponsor of a first collection of entities, sharing common characteristics, to be used for selection criteria for presenting a first content item. References to the first content item and selection criteria are stored. A query is received including terms or phrases associated with a first entity. It is determined that the first entity is included in the first collection of entities, wherein the terms or phrases do not include the first collection. Eligible content items are identified, each being associated with selection criteria including criteria specifying the first collection of entities. At least a portion of the first collection of entities is provided for presentation along with search results, including providing one or more of the eligible content items and the first content item.

22 Claims, 4 Drawing Sheets

(56) References Cited

U.S. PATENT DOCUMENTS

| | | | |
|---|---|---|---|
| 2007/0078822 A1* | 4/2007 | Cucerzan et al. | 707/3 |
| 2007/0174258 A1* | 7/2007 | Jones et al. | 707/3 |
| 2008/0040221 A1* | 2/2008 | Wiseman et al. | 705/14 |
| 2008/0243607 A1 | 10/2008 | Rohan et al. | |
| 2009/0319517 A1* | 12/2009 | Guha et al. | 707/5 |
| 2010/0094867 A1* | 4/2010 | Badros et al. | 707/725 |
| 2010/0198837 A1* | 8/2010 | Wu et al. | 707/748 |
| 2010/0268600 A1* | 10/2010 | Banko et al. | 705/14.52 |
| 2010/0324993 A1* | 12/2010 | Kacholia et al. | 705/14.54 |
| 2011/0078718 A1* | 3/2011 | Jakobi et al. | 725/14 |
| 2011/0119139 A1* | 5/2011 | Dean et al. | 705/14.73 |
| 2011/0246910 A1* | 10/2011 | Moxley et al. | 715/758 |
| 2011/0282856 A1 | 11/2011 | Ganti et al. | |
| 2011/0282888 A1 | 11/2011 | Koperski et al. | |
| 2011/0295678 A1* | 12/2011 | Seldin et al. | 705/14.42 |
| 2012/0150657 A1 | 6/2012 | Rubinstein et al. | |
| 2013/0085865 A1 | 4/2013 | Zhou et al. | |
| 2013/0091013 A1 | 4/2013 | Wang et al. | |

FOREIGN PATENT DOCUMENTS

| | | |
|---|---|---|
| WO | WO 2006/066052 | 6/2006 |
| WO | WO 2007/113546 | 10/2007 |
| WO | WO 2010/148410 | 12/2010 |

OTHER PUBLICATIONS

Joshi et al., "Contextual Advertising through Entity Extraction," Int'l J Engineering Adv. Technol., 2013, 2(3):579-582.

International Preliminary Report on Patentability in International Application No. PCT/US2014/045966, mailed Jan. 28, 2016, 9 pages.

\* cited by examiner

SELECTING CONTENT ASSOCIATED WITH A COLLECTION OF ENTITIES

BACKGROUND

This specification relates to information presentation.

The Internet provides access to a wide variety of resources. For example, video and/or audio files, as well as webpages for particular subjects or particular news articles, are accessible over the Internet. Access to these resources presents opportunities for other content (e.g., advertisements) to be provided with the resources. For example, a webpage can include slots in which content can be presented. These slots can be defined in the webpage or defined for presentation with a webpage, for example, along with search results.

Content slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or the relevance of the sponsored content to content presented on a page hosting the slot or a request that is received for the sponsored content. The content can be provided to a user device such as a personal computer (PC), a smartphone, a laptop computer, a tablet computer, or some other user device. Content can be related in different ways, such as being related to one or more entities or collections of entities.

SUMMARY

In general, one innovative aspect of the subject matter described in this specification can be implemented in methods that include a computer-implemented method for providing content. The method includes receiving, from a content sponsor, an indication of a first collection of entities to be used as selection criteria for presenting a first content item of a campaign responsive to received requests, where the first collection of entities is a grouping of entities that share at least one common characteristic. The method further includes storing in inventory a reference to the first content item and the indicated selection criteria. The method further includes, after the storing, receiving a query including one or more terms or phrases, wherein the one or more terms or phrases identifies or is associated with a first entity. The method further includes determining, using one or more processors, that the first entity is included in the first collection of entities, where the one or more terms or phrases does not include the first collection. The method further includes identifying one or more eligible content items from the inventory of content items, each eligible content item being associated with selection criteria including criteria specifying the first collection of entities, where identifying includes identifying the first content item. The method further includes providing at least a portion of the first collection of entities for presentation to a user along with search results responsive to the query, where providing at least a portion of the first collection of entities includes providing one or more of the eligible content items including the first content item along with the portion of the first collection of entities.

These and other implementations can each optionally include one or more of the following features. The first collection of entities can be named, and the method can further include providing to the content sponsor an interface for enabling a selection of the first collection of entities from a plurality of available collection of entities, and receiving from content sponsor an explicit designation of the first collection of entities by name to be used as the selection criteria for delivery of the first content item. The explicit designation can include a designation of the first collection of entities and an amount of a bid to be used when evaluating the first content item with other eligible content items in an auction or reservation selection system. Determining that the first entity is included in the first collection of entities can include determining when the one or more terms or phrases indicates a collection of entities and identifying the collection of entities as the first collection of entities. Determining the first entity is included in the first collection of entities can include determining when the one or more terms or phrases indicates a first entity, locating a collection that includes the first entity and identifying the collection that includes the first entity as the first collection of entities. Determining the first entity is included in the first collection of entities can include determining when the one or more terms or phrases indicates a collection of entities and identifying the collection as the first collection of entities, or determining when the one or more terms or phrases indicate a first entity, locating a collection that includes the first entity and identifying the collection that includes the first entity as the first collection of entities. The method can further include determining a plurality of collections of entities based at least in part on the one or more terms or phrases and selecting one of the plurality of collections of entities as the first collection of entities based at least in part on a predetermined selection criteria. The predetermined selection criteria can be selected from the group comprising a most popular collection, a most likely collection or a most relevant collection. The first collection of entities can include a plurality of elements that are displayable on a device for presentation to a user, and the one or more eligible content item can be presented in a slot that precedes, succeeds or is interposed with the elements of the first collection of entities. The one or more eligible content items can be advertisements, and the first collection of entities can be a group of entities that are distinct from the search results. The method can further include: presenting an interface to a content sponsor for a campaign that is associated with distribution of the first content item, the interface including a control for indicating one or more selection criteria for use in determining when to identify the first content item as an eligible content item for consideration for delivery in response to a received request for a content item; receiving a selection using the control of a collection, the collection representing a group of entities that share at least one common characteristic, the collection designation specifying when to present the first content item responsive to requests including requiring at least a portion of the collection be presented along with the first content item; and storing the campaign including storing an association between the selected collection and the first content item. The method can further include verifying that the first content item qualifies as being included in the first collection else disallowing the selection to use the first collection as selection criteria for the campaign.

In general, another innovative aspect of the subject matter described in this specification can be implemented in computer program products that include a computer program product tangibly embodied in a computer-readable storage device and comprising instructions. The instructions, when executed by one or more processors, cause the processor to: receive, from a content sponsor, an indication of a first collection of entities to be used as a selection criteria for presenting a first content item of a campaign responsive to received requests, wherein the first collection of entities is a grouping of entities that share at least one common characteristic; store in inventory a reference to the first content item and the indicated selection criteria; after the storing, receive a query including one or more terms or phrases, wherein the one or more terms or phrases identifies or is associated with a first entity; determine that the first entity is included in the first collection of entities, wherein the one or more terms of phrases does not include the first collection; identify one or more eligible content items from the inventory of content items, each eligible content item being associated with selection criteria including criteria specifying the first collection of entities, wherein identifying includes identifying the first content item; and provide at least a portion of the first collection of entities for presentation to a user along with search results responsive to the query, wherein providing at least a portion of the first collection of entities includes providing one or more of the eligible content items including the first content item along with the portion of the first collection of entities.

These and other implementations can each optionally include one or more of the following features. The first collection of entities can be named, and the instructions can further include instructions that cause the one or more processors to provide to the content sponsor an interface for enabling a selection of the first collection of entities from a plurality of available collection of entities, and receive from content sponsor an explicit designation of the first collection of entities by name to be used as the selection criteria for delivery of the first content item. The explicit designation can include a designation of the first collection of entities and an amount of a bid to be used when evaluating the first content item with other eligible content items in an auction or reservation selection system. Determining that the first entity is included in the first collection of entities can include determining when the one or more terms or phrases indicates a collection of entities and identifying the collection of entities as the first collection of entities.

In general, another innovative aspect of the subject matter described in this specification can be implemented in systems, including a system comprising one or more processors and one or more memory elements including instructions. The instructions, when executed, cause the one or more processors to: receive, from a content sponsor, an indication of a first collection of entities to be used as a selection criteria for presenting a first content item of a campaign responsive to received requests, wherein the first collection of entities is a grouping of entities that share at least one common characteristic; store in inventory a reference to the first content item and the indicated selection criteria; after the storing, receive a query including one or more terms or phrases, wherein the one or more terms or phrases identifies or is associated with a first entity; determine that the first entity is included in the first collection of entities, wherein the one or more terms of phrases does not include the first collection; identify one or more eligible content items from the inventory of content items, each eligible content item being associated with selection criteria including criteria specifying the first collection of entities, wherein identifying includes identifying the first content item; and provide at least a portion of the first collection of entities for presentation to a user along with search results responsive to the query, wherein providing at least a portion of the first collection of entities includes providing one or more of the eligible content items including the first content item along with the portion of the first collection of entities.

These and other implementations can each optionally include one or more of the following features. The first collection of entities can be named, and the instructions can further include instructions that cause the one or more processors to provide to the content sponsor an interface for enabling a selection of the first collection of entities from a plurality of available collection of entities, and receive from content sponsor an explicit designation of the first collection of entities by name to be used as the selection criteria for delivery of the first content item. The explicit designation can include a designation of the first collection of entities and an amount of a bid to be used when evaluating the first content item with other eligible content items in an auction or reservation selection system. Determining that the first entity is included in the first collection of entities can include determining when the one or more terms or phrases indicates a collection of entities and identifying the collection of entities as the first collection of entities.

Particular implementations may realize none, one or more of the following advantages. Content sponsors can specify that their content items are to be included (or presented more prominently) when a collection of entities is presented to a user.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes systems, methods, computer program products and mechanisms for providing content in association with a collection of entities, e.g., in a display to a user. For example, an indication can be received, from a content sponsor, of a first collection of entities to be used as selection criteria for presenting a first content item of a campaign responsive to received requests. The first collection of entities is a grouping of entities that share at least one common characteristic. A reference to the first content item and the indicated selection criteria is stored in inventory. After the storing, a query is received including one or more terms or phrases, where the one or more terms or phrases identifies or is associated with a first entity. It is determined that the first entity is included in the first collection of entities, wherein the one or more terms or phrases do not include the first collection. One or more eligible content items are identified from an inventory of content items. Each eligible content item is associated with selection criteria including criteria specifying the first collection of entities, wherein identifying includes identifying the first content item. At least a portion of the first collection of entities is presented for presentation to a user along with search results responsive to the query, wherein providing at least a portion of the first collection of entities includes providing one or more of the eligible content items including the first content item along with the portion of the first collection of entities.

In some implementations, the collection of entities can be provided along with search results in response to a query entered by a user in a browser. One or more content items related to the collection of entities can also be identified. The user can be presented with search results responsive to the query, e.g., in one area of a user interface. The collection of entities can be displayed in a different area of the user interface, and the collection of entities can include one or more content items that are related to the collection of entities. Other mechanisms can be used for selecting and presenting content that is associated with collections of entities.

Figure 1:
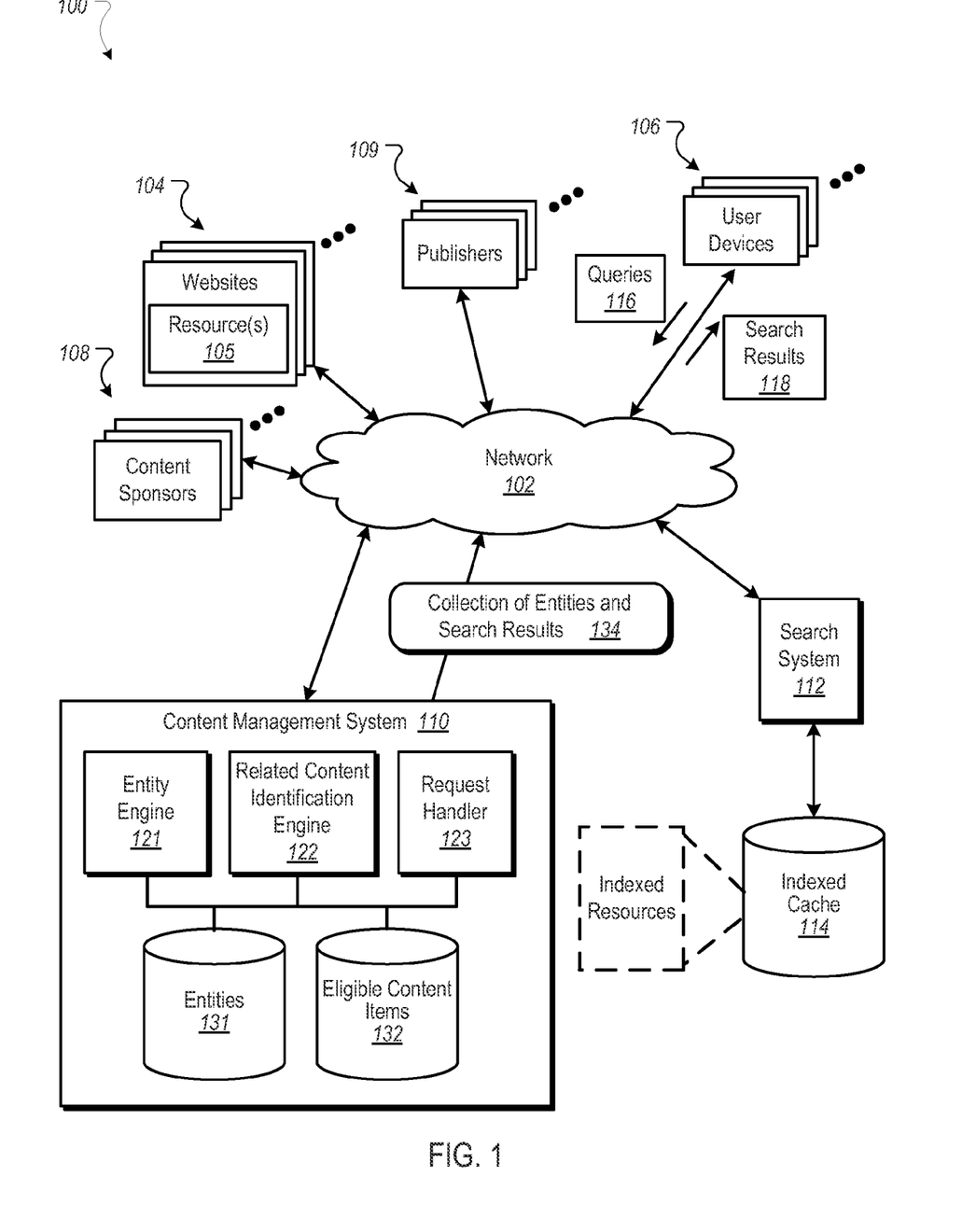
FIG. 1 is a block diagram of an example environment for delivering content.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

In some implementations, in response to a request for content, the content management system 110 can provide a collection of entities and search results 134 that is responsive to the request. For example, the search results can be displayable to the user in a search results area of a browser or web page. The collection of entities can be displayed, for example, in a knowledge graph area or some other area separate from the search results area (and including different content). In some implementations, the collection of entities can include organic content, e.g., entity-related advertisements that are all related in some way, such as by at least one common characteristic. The collection of entities can also include a related content item that is added to the collection of entities presented to the user. The content item can be, for example, an advertisement that an associated content sponsor has specified to be selected when related to a collection of entities.

The content management system 110 can include plural engines. An entity engine 121, for example, can evaluate terms and phrases in a query received by the content management system 110 to identify at least one associated collection of entities. A collection of entities identified by the entity engine 121 can include entities that share at least one common characteristic. Entities can include, for example, one or more of a product, a product category, a product manufacturer, a specific model of a product, a vertical, a service, a service category, or a user activity. The entity engine 121 can select one or more particular collections of entities, e.g., that are the most likely collections of entities to be associated with the terms and phrases. In some implementations, the entity engine can select one collection of entities for evaluation and presentation to a user.

A related content identification engine 122, for example, can identify eligible content items from an inventory of content items (e.g., eligible content items 132). Each eligible content item that is identified can be associated with selection criteria, including criteria specifying (or associated with) a specific collection of entities and a received query.

A request handler 123, for example, can handle requests for content received by the content management system 110, and in response to each request, provide one or more content items to the requestor. For example, the request for content can be a request to fill a content item slot on a web page displayed in a browser on the user device 106. In response to the request for content, the request handler 123 can provide a content item, e.g., an advertisement having characteristics that match the characteristics of an advertisement slot on the user device 106. The request handler 123 can also provide search results 118 in response to received search queries 116.

The environment 100 can include plural data stores, which can be stored locally by the content management system 110, stored somewhere else and accessible using the network 102, generated as needed from various data sources, or some combination. A data store of entities 131, for example, can include identifiers, definitions and other information about entities such as products, product categories, product manufacturers, specific models of products, verticals, services, service categories or user activities. Entities 131 can also include information for use in identifying entities, e.g., including keywords or other information associated with each entity that can be used by the entity engine 121 for identifying entities and collections of entities associated with a particular content item. Entities and entity definitions can be hierarchical, meaning that one entity (e.g., cameras) can include other sub-entities (e.g., land cameras and digital cameras). Other relationships among entities can exist. For example, entities can be commercially related as determined by evaluating one or more of purchase history or other resource data (such as ad inventory data).

The eligible content items 132 can include content items, such as advertisements, that can be selected based on selected criteria. For example, advertisements that are included in the eligible content items 132 can be selected using keywords and/or other selection criteria that can correspond to entities.

In some implementations, content sponsors 108 can be provided with an interface (e.g., a content sponsor interface) by which a particular content sponsor 108 can specify campaign parameters for selecting their content. One possible selection criteria that can be specified can be a collection of entities. For example, for a given advertising campaign, the content sponsor 108 can specify that an advertisement is to be provided with selected collections of entities when they are presented to a user. In some implementations, the parameters can specify, for example, that the advertisement is to be displayed or presented first within the collection of entities. In some implementations, the parameters can specify, for example, that when an advertisement associated with a given campaign is already to be provided in a designated collection, that the advertisement be placed in a more prominent location (e.g., moved to the beginning of a list for immediate display without requiring scrolling or paging). The moved or highlighted advertisement can obviate the inclusion of the same content at the lesser prominent location in the collection presentation. In some implementations, the content sponsor 108 can specify that a different version of a creative is to be used when being selected based on collections of entities. Collections of entities and presentation of other content items with collections of entities is discussed in greater detail below with respect to FIG. 2.

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript™ scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, mobile communication devices (e.g., smartphones), tablet computers and other devices that can send and receive data over the network 102. A user device 106 typically includes one or more user applications, such as a web browser, to facilitate the sending and receiving of data over the network 102.

The user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or webpage, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is provided in response to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a webpage title, a snippet of text or a portion of an image extracted from the webpage, and the URL of the webpage. Search results pages can also include one or more slots in which other content items (e.g., ads) can be presented. In some implementations, slots on search results pages or other webpages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110 in association with a given request. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals and behavioral signals.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection or other interaction with) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a webpage, and consummates a purchase there before leaving that webpage. A conversion can also be defined by a content provider to be any measurable or observable user action, such as downloading a white paper, navigating to at least a given depth of a website, viewing at least a certain number of webpages, spending at least a predetermined amount of time on a web site or webpage, registering on a website, experiencing media, or performing a social action regarding a content item (e.g., an ad), such as republishing or sharing the content item. Other actions that constitute a conversion can also be used.

In some implementations, conversions may be more likely to occur when the content item is displayed among a collection of entities, e.g., as a first entity (or first page instance) among a collection of entities. For example, the user may be more likely to interact with a movie-related advertisement or some other content item if it presented as the first advertisement among others that are related, e.g., by being associated with and/or being compared with other entities in the collection of entities.

Figure 2:
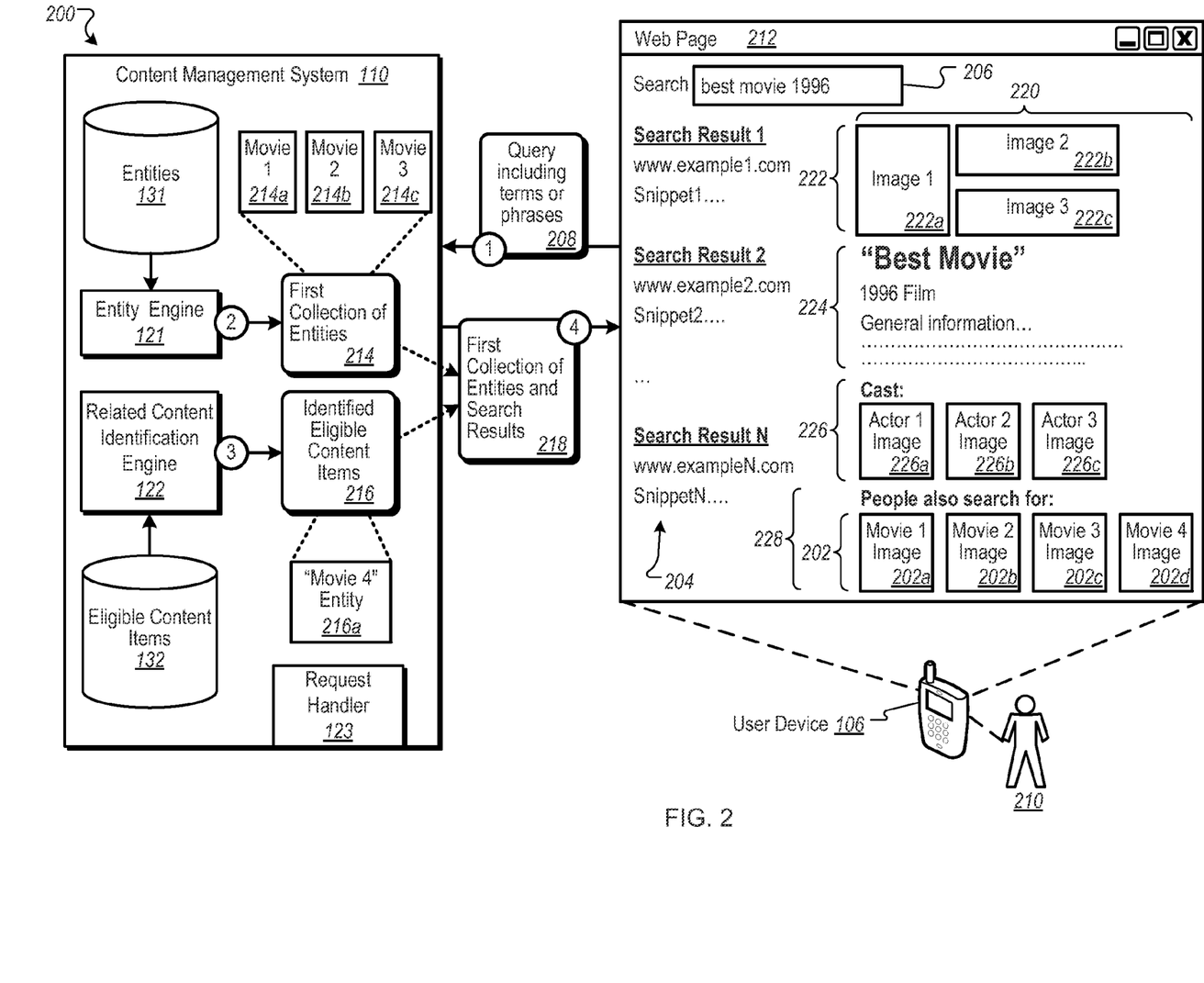
FIG. 2 shows an example system for providing a collection of entities with search results.

FIG. 2 shows an example system 200 for providing a collection of entities 202 with search results 204. For example, the content management system 110 can provide the search results 204 in response to a search query 206 received from the user device 106. At the same time, the content management system 110 can provide the collection of entities 202 (e.g., advertisements) that can include, for example, a content item that is identified using the search query 206 selection criteria used in identifying the entities. A more detailed example follows using an example sequence of stages 1-4.

At stage 1, the content management system 110 can receive a query 208 that includes one or more terms and/or phrases. The query can be based, for example, on the search query 206, e.g., "best movie 1996" that a user 210 has entered on a web page 212. The query 208 can also include other information, e.g., profile information of the user, the user's location, and/or other information not included in the search query 206. The search query 206, for example, can be a query that a user 210 has entered on a web page 212.

In some implementations, the query 208 can include information that signals the content management system 110, for example, that collections of entities are to be considered in processing the query. For example, the information can be based on user settings and/or preferences in which the user has indicated an interest in receiving more pertinent content based on entities and collections of entities.

At stage 2, the entity engine 121, for example, can determine a first collection of entities 214 based at least in part on the one or more terms or phrases included in the query 208. The first collection of entities 214 can be, for example, a grouping of entities (e.g., movies, or advertisements about movies) that share at least one common characteristic (e.g., related to a movie or television show or other product, service or event). The entity engine 121 can determine the common characteristic, for example, using terms and/or phrases in "best movie 1996." In the current example, entities 214a-214c are identified that are in a collection of movies determined using the query 208.

At stage 3, the related content identification engine 122, for example, can identify eligible content items 216 from an inventory of content items (e.g., eligible content items 132). Each eligible content item that is identified can be associated with selection criteria, including criteria specifying (or associated with) the first collection of entities 214. For example, the selection criteria can include selection criteria related to the best movie of 1996, movies in general, actors and actresses, the year 1996, and/or other selection criteria.

At stage 4, the content management system 110, for example, can provide a combined result 218 for presentation to the user 210 that includes at least a portion of the first collection of entities 214 along with search results 204. For example, the portion of the first collection of entities can include one or more of the eligible content items (e.g., an advertisement for Movie 4) along with the portion (e.g., some or all) of the first collection of entities 214. In this example, the advertisement for Movie 4 is associated with an entity 216a, e.g., associated with Movie 4.

The received collection of entities and search results can be displayed on the web page 212 in different ways. For example, the web page 212 can be organized such that search results 204 responsive to the search query 206 are displayed in one area. Other areas of the web page 212 can be used to display additional information, e.g., in a knowledge graph area 220. In some implementations, the knowledge graph area 220 can include images 222 (e.g., with images 222a-222c related to the first collection of entities 214), header information 224 (e.g., identifying at least a title and general information), and cast information 226 (e.g., including cast member images 226a-226c), and other information.

In some implementations, the knowledge graph area 220 can also include a collection area 228, e.g., an area in which the collection of entities 202 is displayed. For example, the collection of entities 202 can include entities 202a-202c that correspond to the first collection of entities 214 identified by the entity engine 121. An entity 202d, for example, can be (or correspond to) the advertisement for Movie 4 as identified by the related content identification engine 122.

In some implementations, the presentation order of the collection of entities 202 can depend on various factors. For example, content sponsors can be allowed to bid on the selection of their content items (e.g., advertisements) to be presented with collections of entities. In some implementations, content sponsors can specify that their content items, when selected, are to be presented more prominently, e.g., listed first (e.g., before the entities 202a). In another example, the presentation order/location of a content sponsor's content item can be improved, e.g., so that the entity 202d is guaranteed to appear on a first screen when the collection of entities 202 is a scrollable list. Other means of accentuating or otherwise emphasizing a specific piece of content in the collection are possible.

The collection of entities 202 is just one example of sponsored content that can be displayed in the collection area 228 or other areas on the web page 212. In another example, other types of sponsored content (e.g., advertisements for hotels and restaurants) can be displayed, e.g., in a task-triggered event, such as if it is suspected that the user is searching for vacation information related to a particular destination location.

Figure 3:
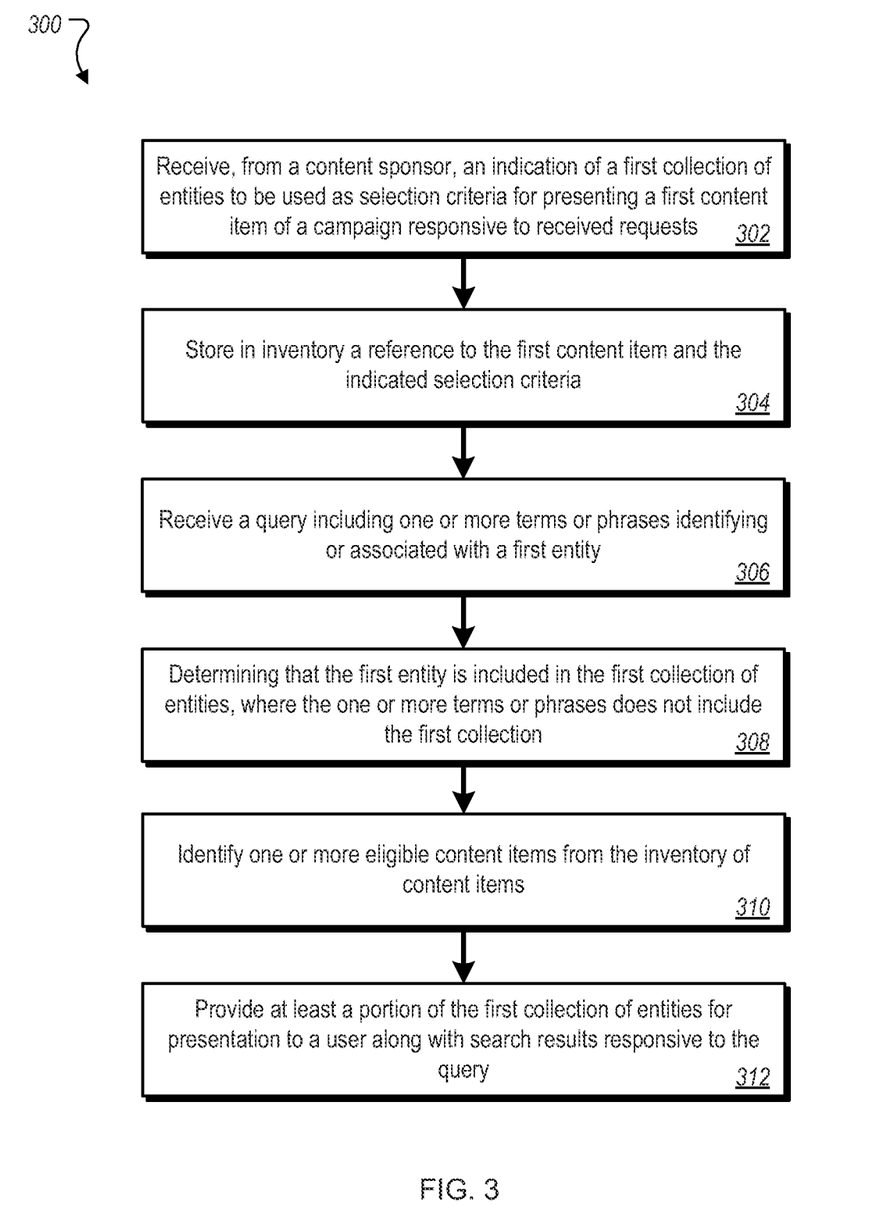
FIG. 3 is a flowchart of an example process for providing a collection of entities with search results.

FIG. 3 is a flowchart of an example process 300 for providing a collection of entities with search results. In some implementations, the content management system 110 can perform stages of the process 300 using instructions that are executed by one or more processors. FIGS. 1-2 are used to provide example structures for performing the stages of the process 300.

An indication is received from a content sponsor of a first collection of entities to be used as selection criteria for presenting a first content item of a campaign responsive to received requests (302). The first collection of entities is a grouping of entities that share at least one common characteristic. For example, as part of a campaign, a content sponsor 108 can use a content sponsor interface to specify that certain entities 131 are to be used in association with the selection of eligible content items 132 in response to requests for content received from users.

A reference to the first content item and the indicated selection criteria are stored in inventory (304). For example, the information about the entities and eligible content items associated with the content sponsor's campaign can be stored, e.g., in a data store of campaigns.

After the storing, a query is received including one or more terms or phrases, where the one or more terms or phrases identifies or is associated with a first entity (306). For example, the content management system 110 can receive the query 208 from the user device 106. The query 208 can include terms and phrases, e.g., "best movie 1996" entered by the user 210 on the web page 212, e.g., that is associated with one of the entities 131 related to movies. As an example, the entity engine 121 can determine the first collection of entities 214 that can include entities 214a-214c corresponding to Movies 1-3, respectively, are associated with the query 208.

In some implementations, the first collection of entities can be named. The process 300 can further include providing to the content sponsor an interface for enabling a selection of the first collection of entities from a plurality of available collection of entities, and receiving from content sponsor an explicit designation of the first collection of entities by name to be used as the selection criteria for delivery of the first content item. For example, the collection of entities that includes entities 214a-214c can have a user-friendly name such as "1996 Movies that are best rated," "Best rated related Entities" or some other descriptive name. In another example, the name of a collection of entities can be represented by a number, a path name, and/or some other identifier or mechanism. Any or all of these names for the collection of entities can have associated with them an explicit list of entities that belong to the collection (e.g., a list of movie titles). Using a content sponsor interface, for example, a content sponsor can select one or more entities from a list of presented entities. The selected entities can be stored, e.g., with other campaign information associated with the campaign sponsor.

In some implementations, the explicit designation can include a designation of the first collection of entities and an amount of a bid to be used when evaluating the first content item with other eligible content items in an auction or reservation selection system. For example, bids provided by content sponsors for the presentation of their sponsored content can be tied to specific names of collections of entities and corresponding bid amounts to be used in an auction with other eligible content items.

In some implementations, determining that the first entity is included in the first collection of entities can include determining when the one or more terms or phrases indicates a collection of entities and identifying the collection entities as the first collection of entities. For example, to determine the collection of entities 214, the entity engine 121 can use terms or phrases in the query 208 to look up (e.g., in a table, data base or other structure) the corresponding associated entities, such as the collection of entities that includes entities 214a-214c. In some implementations, information used for this type of determination can be generated offline, e.g., from historical queries of users, using the queries terms and phrases they used and the corresponding entities represented by the responsive content. Other ways can be used for using historical information for associating terms and phrases with entities and/or collections of entities.

In some implementations, determining the first entity is included in the first collection of entities can include determining when the one or more terms or phrases indicates a first entity, locating a collection that includes the first entity, and identifying the collection that includes the first entity as the first collection of entities. For example, the entity engine 121 can use one or more terms or phrases (e.g., "Best movie 1996" in the query 208 to determine an entity (e.g., Movie 1). The entity engine 121 can then use the entity to look up a collection of entities that includes the entity (e.g., all entities that include Movie 1 as part of a collection).

In some implementations, determining the first entity is included in the first collection of entities can be performed in either one of at least two ways. In some implementations, it is determined when the one or more terms or phrases indicates a collection of entities, and the collection is identified as the first collection of entities. For example, the entity engine 121 can use one or more terms in "best movies 1996" to look up a corresponding collection of entities (e.g., the critically acclaimed movies of 1996), and identify that collection of entities as the first collection of entities 214. In some implementations, it is determined when the one or more terms or phrases indicate a first entity, a collection is located that includes the first entity, and the collection is identified that includes the first entity as the first collection of entities. Other methods can be used for determining the first collection of entities.

In some implementations, the process 300 can further include steps for selecting the first collection of entities from a plurality of collections of entities. A plurality of collections of entities is determined based at least in part on the one or more terms or phrases. For example, the entity engine 121 can use information from the received query 208 to determine multiple collections of entities associated with the query 208, e.g., including collections of movies and/or collections of other entities. One of the plurality of collections of entities is selected as the first collection of entities based at least in part on, for example, a predetermined selection criteria. For example, the entity engine 121 can use predetermined selection criteria such as a most popular collection, a most likely collection, or a most relevant collection to select one of the plurality of collections as the first collection of entities 214.

In some implementations, the first collection of entities can include a plurality of elements that are displayable on a device for presentation to a user, and the one or more eligible content item can be presented in a slot that precedes, succeeds or is interposed with the elements of the first collection of entities. As an example, the collection of entities 214 can include entities 214a-214c that correspond to entities 202a-202c that are presented in the collection area 228. The advertisement for Movie 4 identified by the related content identification engine 122 can be presented in the collection area 228, e.g., as the fourth element as entity 202d, as the associated entity 216a related to Movie 4. In this example, the entity 202d succeeds the entities 202a-202c. In some implementations, the entity 202d can precede (or be inserted within) the other entities 202a-202c. The placement can be based, at least in part, on selection parameters specified by content providers for the selection of their content, including bid amounts.

It is determined that the first entity is included in the first collection of entities, wherein the one or more terms or phrases do not include the first collection (308). For example, the entity engine 121 can determine that the entity 216a is included in the first collection of entities 214 and that the query 208 does not include the first collection of entities 214.

In some implementations, the one or more eligible content items can be advertisements, and the first collection of entities can be a group of entities that are distinct from the search results. In the current example, the identified eligible content item 216 can be the advertisement for the Movie 4 that is associated with the entity 216a. Further, first collection of entities 214 are different from the search results 204.

One or more eligible content items are identified from an inventory of content items (310). For example, each eligible content item can be associated with selection criteria including criteria specifying the first collection of entities, and identifying the one or more eligible content items can include identifying the first content item.

At least a portion of the first collection of entities is provided for presentation to a user along with search results responsive to the query (312). Providing at least a portion of the first collection of entities includes providing one or more of the eligible content items including the first content item along with the portion of the first collection of entities. For example, the user can be presented with search results 204, e.g., in a search results area of the web page. At the same time, the collection of entities 202 can be provided within the knowledge graph area 220 or some other area separate from the search results 204. The collection of entities 202 that are presented can include most or all of the entities 214a-214c and at least one of the eligible content items 216. For example, presentation of the entity 202d with the entities 202a-202c can cause some of the entities 202 not to be shown. One or more of the entities 202, for example, can be replaced by one or more advertisements (e.g., entity 202d) that are from the eligible content items 216.

In some implementations, sponsored content can replace all of the collection of entities 202 that would otherwise be displayed. For example, the collection of entities 202 can include only advertisements that are selected from the identified eligible content items 216 and exclude advertisements selected from the first collection of entities 214.

In some implementations, the process 300 can further include additional steps that are used by a content sponsor, for example, to specify campaign parameters for selecting and presenting content items with collections of entities. For example, the content sponsor can be presented with an interface for a campaign (e.g., an advertisement campaign) that is associated with distribution of the first content item (e.g., an advertisement). The interface can include a control that the content sponsor can use, for example, to indicate one or more selection criteria for identifying when to serve the content (e.g., advertisements). For example, the selection criteria can be used in determining when to identify the first content item as an eligible content item for consideration for delivery in response to a received request (e.g., a query) for a content item. The interface can receive, from the content sponsor using the control, a selection of a collection. The collection identification can represent a group of entities that share at least one common characteristic. When designating the collection, the content sponsor can specify when to present the first content item responsive to requests, including requiring that at least a portion of the collection be presented along with the first content item (e.g., when the collection is already scheduled to be presented to a user, present this content item associated with this campaign along with the collection or in a prominent way in the collection). The campaign can be stored, including storing an association between the selected collection and the first content item.

In some implementations, the content delivery system can verify that the first content item qualifies as being included in the first collection, and otherwise disallow the selection (e.g., disallow the user to use the first collection as selection criteria for the campaign). For example, if the content sponsor specifies an advertisement (e.g., for kitchen appliances) that is not related to a collection of entities (e.g., action movies), then the interface can inform the content sponsor that the association is not allowed.

Figure 4:
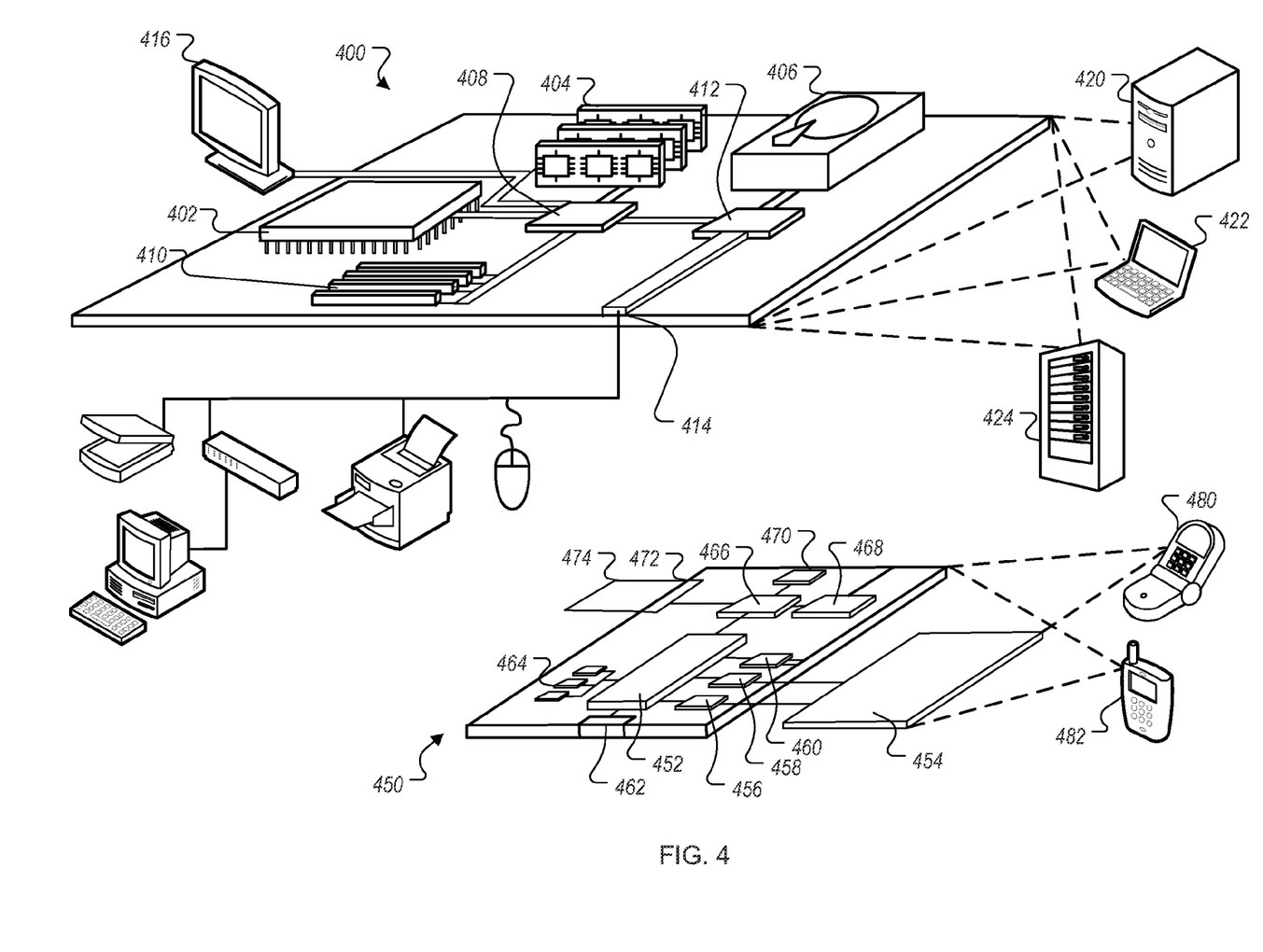
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, from a content sponsor, an indication of a first collection of entities to be used as selection criteria for presenting a first content item of a campaign responsive to received requests, wherein the first collection of entities is a grouping of entities that share at least one common characteristic;
storing in inventory a reference to the first content item and the indicated selection criteria;
after the storing, receiving a query including one or more terms or phrases, wherein the one or more terms or phrases identifies or is associated with a first entity;
determining, using one or more processors, that the first entity is included in the first collection of entities, wherein the one or more terms or phrases does not include the first collection;
identifying one or more eligible content items from an inventory of content items, each eligible content item being associated with selection criteria including criteria specifying the first collection of entities, wherein identifying includes identifying the first content item; and
providing at least a portion of the first collection of entities for presentation to a user along with search results responsive to the query, wherein providing at least a portion of the first collection of entities includes providing one or more of the eligible content items including the first content item along with the portion of the first collection of entities including dynamically arranging a presentation of the portion of the first collection to position the first content item more prominently or visually emphasize the first content item based on a bid by the content sponsor.

2. The method of claim 1 wherein the first collection of entities is named, and wherein the method further comprises providing to the content sponsor an interface for enabling a selection of the first collection of entities from a plurality of available collection of entities, and receiving from content sponsor an explicit designation of the first collection of entities by name to be used as the selection criteria for delivery of the first content item.

3. The method of claim 2 wherein the explicit designation includes a designation of the first collection of entities and an amount of a bid to be used when evaluating the first content item with other eligible content items in an auction or reservation selection system.

4. The method of claim 1 wherein determining that the first entity is included in the first collection of entities includes determining when the one or more terms or phrases indicates a collection of entities and identifying the collection entities as the first collection of entities.

5. The method of claim 1 wherein determining the first entity is included in the first collection of entities includes determining when the one or more terms or phrases indicates a first entity, locating a collection that includes the first entity and identifying the collection that includes the first entity as the first collection of entities.

6. The method of claim 1 wherein determining the first entity is included in the first collection of entities includes:
determining when the one or more terms or phrases indicates a collection of entities and identifying the collection as the first collection of entities; or
determining when the one or more terms or phrases indicates a first entity, locating a collection that includes the first entity and identifying the collection that includes the first entity as the first collection of entities.

7. The method of claim 1 further comprising:
determining a plurality of collections of entities based at least in part on the one or more terms or phrases; and
selecting one of the plurality of collections of entities as the first collection of entities based at least in part on a predetermined selection criteria.

8. The method of claim 7 wherein the predetermined selection criteria is selected from the group comprising a most popular collection, a most likely collection or a most relevant collection.

9. The method of claim 1 wherein the first collection of entities includes a plurality of elements that are displayable on a device for presentation to a user, and wherein the one or more eligible content item is presented in a slot that precedes, succeeds or is interposed with the elements of the first collection of entities.

10. The method of claim 1 wherein the one or more eligible content items are advertisements and the first collection of entities is a group of entities that are distinct from the search results.

11. The method of claim 1 further comprising:
presenting an interface to a content sponsor for a campaign that is associated with distribution of the first content item, the interface including a control for indicating one or more selection criteria for use in determining when to identify the first content item as an eligible content item for consideration for delivery in response to a received request for a content item;
receiving a selection using the control of a collection, the collection representing a group of entities that share at least one common characteristic, the collection designation specifying when to present the first content item responsive to requests including requiring at least a portion of the collection be presented along with the first content item; and
storing the campaign including storing an association between the selected collection and the first content item.

12. The method of claim 11 further comprising verifying that the first content item qualifies as being included in the first collection else disallowing the selection to use the first collection as selection criteria for the campaign.

13. A computer program product embodied in a non-transitive computer-readable medium including instructions, that when executed, cause one or more processors to:
receive, from a content sponsor, an indication of a first collection of entities to be used as a selection criteria for presenting a first content item of a campaign responsive to received requests, wherein the first collection of entities is a grouping of entities that share at least one common characteristic;
store in inventory a reference to the first content item and the indicated selection criteria;
after the storing, receive a query including one or more terms or phrases, wherein the one or more terms or phrases identifies or is associated with a first entity;
determine that the first entity is included in the first collection of entities, wherein the one or more terms of phrases does not include the first collection;
identify one or more eligible content items from the inventory of content items, each eligible content item being associated with selection criteria including criteria specifying the first collection of entities, wherein identifying includes identifying the first content item; and
provide at least a portion of the first collection of entities for presentation to a user along with search results responsive to the query, wherein providing at least a portion of the first collection of entities includes providing one or more of the eligible content items including the first content item along with the portion of the first collection of entities including dynamically arranging a presentation of the portion of the first collection to position the first content item more prominently or visually emphasize the first content item based on a bid by the content sponsor.

14. The computer program product of claim 13 wherein the first collection of entities is named, and wherein the instructions further include instructions that cause the one or more processors to provide to the content sponsor an interface for enabling a selection of the first collection of entities from a plurality of available collection of entities, and receive from content sponsor an explicit designation of the first collection of entities by name to be used as the selection criteria for delivery of the first content item.

15. The computer program product of claim 14 wherein the explicit designation includes a designation of the first collection of entities and an amount of a bid to be used when evaluating the first content item with other eligible content items in an auction or reservation selection system.

16. The computer program product of claim 13 wherein determining that the first entity is included in the first collection of entities includes determining when the one or more terms or phrases indicates a collection of entities and identifying the collection entities as the first collection of entities.

17. A system comprising:
an entity engine that evaluates terms and phrases in a received query to identify associated collections of entities;
a related content identification engine that identifies eligible content items from an inventory of content items, wherein each eligible content item identified is associated with selection criteria, including criteria specifying, or associated with, a specific collection of entities and the received query;
a request handler that handles requests for content received by a content management system, the content management system selecting and providing content in response to requests for content;
one or more processors; and
one or more memory elements including instructions that, when executed, cause the one or more processors to:
receive, from a content sponsor, an indication of a first collection of entities to be used as a selection criteria for presenting a first content item of a campaign responsive to received requests, wherein the first collection of entities is a grouping of entities that share at least one common characteristic;
store in inventory a reference to the first content item and the indicated selection criteria;
after the storing, receive a query including one or more terms or phrases, wherein the one or more terms or phrases identifies or is associated with a first entity;
determine that the first entity is included in the first collection of entities, wherein the one or more terms of phrases does not include the first collection;
identify one or more eligible content items from the inventory of content items, each eligible content item being associated with selection criteria including criteria specifying the first collection of entities, wherein identifying includes identifying the first content item; and
provide at least a portion of the first collection of entities for presentation to a user along with search results responsive to the query, wherein providing at least a portion of the first collection of entities includes providing one or more of the eligible content items including the first content item along with the portion of the first collection of entities including dynamically arranging a presentation of the portion of the first collection to position the first content item more prominently or visually emphasize the first content item based on a bid by the content sponsor.

18. The system of claim 17 wherein the first collection of entities is named, and wherein the instructions further include instructions that cause the one or more processors to provide to the content sponsor an interface for enabling a selection of the first collection of entities from a plurality of available collection of entities, and receive from content sponsor an explicit designation of the first collection of entities by name to be used as the selection criteria for delivery of the first content item.

19. The system of claim 18 wherein the explicit designation includes a designation of the first collection of entities and an amount of a bid to be used when evaluating the first content item with other eligible content items in an auction or reservation selection system.

20. The system of claim 17 wherein determining that the first entity is included in the first collection of entities includes determining when the one or more terms or phrases indicates a collection of entities and identifying the collection entities as the first collection of entities.

21. The method of claim 1, wherein each of the entities from the first collection of entities comprises a product, a product category, a product manufacturer, a specific model of a product, a vertical, a service, a service category, a user activity, or an entity-related advertisement.

22. The method of claim 1, wherein dynamically arranging the presentation of the portion of the first collection includes positioning the first entity so that the first entity is guaranteed to appear on a first screen when the collection of entities is a scrollable list.

* * * * *